Figure 1:
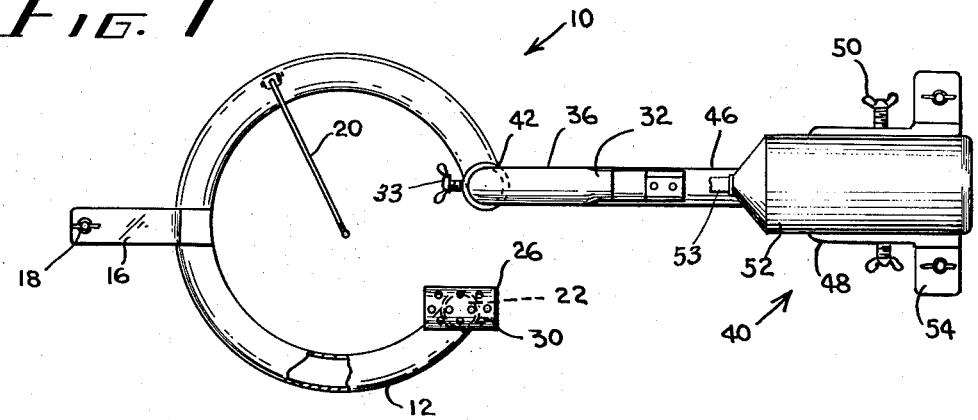

July 4, 1961 P. McDONOUGH ET AL 2,990,829
ICE FISHING HEATER

Filed March 12, 1958 2 Sheets-Sheet 1

INVENTOR.
PETER Mc DONOUGH
EDWARD J. Mc DONOUGH
BY
John L. Woodward
ATTORNEY

July 4, 1961 P. McDONOUGH ET AL 2,990,829
ICE FISHING HEATER
Filed March 12, 1958 2 Sheets-Sheet 2
FIG. 3
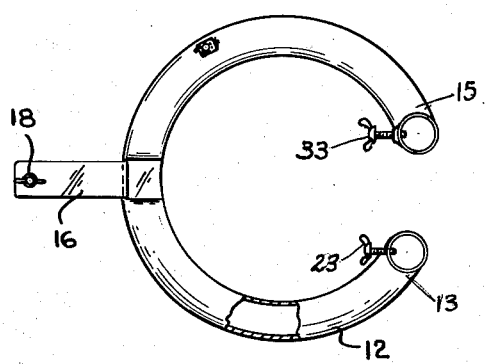
FIG. 4
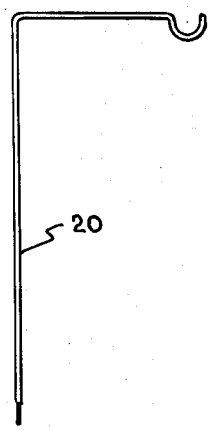
FIG. 5
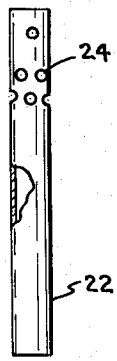
FIG. 6
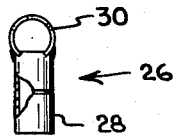
FIG. 7
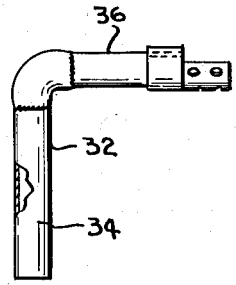
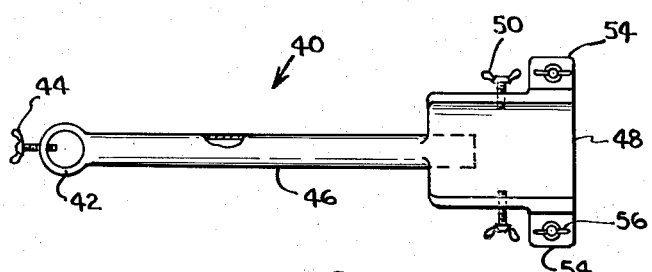
FIG. 8
INVENTOR.
PETER MC DONOUGH
EDWARD J. MC DONOUGH
BY
John L. Woodward
ATTORNEY United States Patent Office 2,990,829
Patented July 4, 1961

2,990,829
ICE FISHING HEATER
Peter McDonough, 857 Woodbridge, and Edward J. McDonough, 499 Greenwood Ave., both of St. Paul, Minn.
Filed Mar. 12, 1958, Ser. No. 720,920
3 Claims. (Cl. 126—271.2)

My invention relates to heaters, and more especially, to heaters adapted for use in ice fishing to prevent freezing of the liquid in a hole cut through the ice on a body of water.

The prior ice-fishing heaters were so devised that the heating chamber extended into the water in the holes cut in the ice on a body of water and in such an arrangement the heat was quickly dissipated in the water and there was not sufficient heat to prevent ice forming in the holes cut in the ice.

The ice-fishing heater comprises a heating chamber formed of a substantially circular-shaped section of hollow pipe which is adapted to be adjacent the top of the water in a hole cut in ice on a body of water. An inlet pipe extends upwardly from the heating chamber and is then bent horizontally from the heating chamber. A fuel support means is slidably mounted on the vertical portion of the inlet pipe and extends in spaced parallel relation with the horizontal portion of the inlet pipe. A portable fuel container is detachably carried on the fuel support and the flame from the fuel container is directed into the open end of the inlet pipe. Adjustable feet are carried on the support and on an arm on the heating chamber which engages the top of the ice. An upstanding pipe extends from the heating chamber and functions as a hand warmer.

It is an object of this invention to provide in an ice-fishing heater, a heating chamber which is adapted to be arranged adjacent the top of the liquid in a hole cut in ice on a body of water.

It is another object of this invention to provide in an ice-fishing heater of means for detachably supporting a portable fuel container.

It is a further object of this invention to provide an ice-fishing heater, the parts of which are demountable.

It is a still further object of this invention to provide in an ice-fishing heater of means for warming the hands of the fishermen.

Other important objects and advantages of our invention will become apparent from the following detailed specification, appended claims, and attached drawings.

Figure 2:
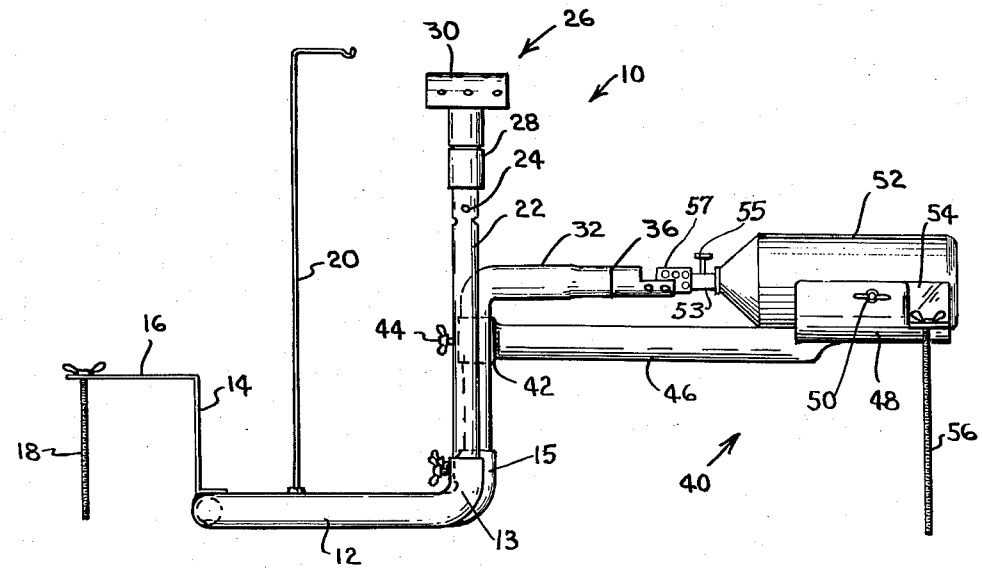

Referring to the drawings, wherein like characters indicate like parts throughout the several views:

FIGURE 1 is a top plan view of the ice-fishing heater.
FIGURE 2 is a view in side elevation of the ice-fishing heater.
FIGURE 3 is a plan view of the heating chamber of the ice-fishing heater.
FIGURE 4 is a side elevational view of a fishing line support.
FIGURE 5 is an elevational view of the hand warmer of the ice-fishing heater.
FIGURE 6 is an end view of the cap for the hand warmer.
FIGURE 7 is a side elevational view of the heat inlet pipe.
FIGURE 8 is a plan view of the support for a portable fuel container.

Referring to the drawings in detail, 10 is an ice-fishing heater which consists of a heating chamber 12 formed of a hollow substantially circular shaped metal pipe provided with opposite ends 13 and 15 which is preferably one inch in diameter, but may be any other desired size. The circular shaped pipe 12 is spaced apart forming an open area 8¼ inches in diameter. This area may be larger or smaller. An upstanding arm 14 provided with an outwardly extending horizontal portion 16 is secured to the heating chamber 12. An elongated screw 18 is carried by the portion 16 of the arm 14. A fishing line support 20 is demountably carried by the heating chamber 12.

An upstanding hollow pipe 22 is demountably connected to one end 13 of the heating chamber or circular pipe 12. The pipe 22 is provided with a plurality of air vents 24. A detachable cap 26 consisting of a collar portion 28 for fitting over the upper end of the pipe 22 and an apertured cover 30 open at both ends extends transversely of the collar 28. The pipe 22 provides means for warming the hands of a fisherman.

A heat inlet pipe 32 is removably mounted on the other end 15 of the heating chamber 12. The inlet pipe 32 consists of a vertical section 34 and a horizontal section 36 formed at the top of the vertical section 34 and extends outwardly from the heating chamber 12.

A support means 40 for supporting a portable fuel container is slidably mounted on the vertical portion 34 of the heat inlet pipe 32. The support 40 consists of a collar 42 slidably mounted on the inlet pipe 32. A threaded bolt 44 holds the support 40 in adjusted position on the heat inlet pipe 32. A tubular arm 46 extends horizontally outward from the heat inlet pipe 32, and an arc-shaped holder 48 is formed on the outer end of the arm 46. Bolts 50 mounted in holes in the opposite side of the holder 48 are employed for securing the container 52 of propane gas in the holder 48. Ears 54 are formed on opposite sides of the holder 48 at its outer end and screw threaded bolts carried in a hole in the ears 54 provide adjustable feet 56 for holder 48. Said container 52 has an outlet pipe 53 provided with a valve control 55, such as a needle type valve, and carrying at its free end an open-ended perforated tubular member 57 of relatively short length forming a burner head.

In operation of the ice-fishing heater 10, the heating chamber 12 is set in a hole cut in the ice on a body of water. The adjustable foot 18 on arm 14 and the two screw threaded bolts 56 on the holder 48 are adapted to engage the top of the ice on opposite sides of the hole cut in the ice. The three adjustable feet are adjusted until the heating chamber or circular pipe 12 is spaced just above the level of the water in the hole cut in the ice. The water level is approximately four inches from the top of the ice.

The collar 42 is adjusted on the inlet pipe 32 so that the outlet end of the fuel container is opposite the open end in the horizontal section 36 of the heat inlet pipe 32. When it is desired, to heat the chamber 12 the valve 55 controlling the propane gas in the container 52 is opened and the gas is lighted. The flame of the burning gas enters the open end of the inlet pipe 32 and this flame heats the inlet pipe 32. The inlet pipe 32 transfers heat to the heating chamber 12 and the heated air in the inlet pipe 32 flows into the chamber 12. The heating chamber 12 being spaced adjacent the top of the water in the hole in the ice will prevent ice forming on the water.

The fishermen are able to warm their hands at the cap 26 mounted on the top of the vertical pipe 22.

The pipe 22 and the inlet pipe 32 are secured to the heating chamber by screw threaded bolts 23 and 33, respectively. The inlet pipe 32 and hand warmer pipe 22 are demountable from the heating chamber 12, and the support 40 can be separated from the inlet pipe 32. It can be seen that the elements of the ice-fishing heater can be demounted for compact storage.

The elbows of all of the pipes are rounded so that more heat is radiated from them.

The holder 40 is preferably made of aluminum. The heat inlet pipe 32, heating chamber 12 and hand warmer 22 are made of iron or cast iron.

In accordance with the patent statutes, we have described the principles of construction and operation of our ice-fishing heater, and while we have endeavored to set forth the best embodiments thereof, we desire to have it understood that these are only illustrative thereof, and that obvious changes may be made within the scope of the following claims without departing from the spirit of our invention.

We claim:

1. A heating device for preventing the refreezing of a hole cut through ice for ice fishing comprising an open-ended substantially ring-shaped member of tubular form having a relatively small transverse dimension and disposed in a horizontal plane forming a substantially circular heating chamber to be disposed in said hole cut through said ice, the open-ended portions of said member being adjacent one another and curved to extend upwardly, an upstanding right-angled inlet pipe being supported in one of said upstanding end portions for communication with said heating chamber and having a horizontally disposed inlet portion extending outwardly of said heating chamber, a horizontal bar having one end clamped to said upstanding portion of said inlet pipe and extending outwardly of said heating chamber and having a concave free end portion, a fuel container having an opening at one end, means in connection with said concave free end portion for supporting said fuel container with said opening in line with said inlet portion, and means for adjustably supporting said heating chamber within said hole cut through ice.

2. The structure set forth in claim 1, a tube upstanding from the other of said free end portions of said heating chamber, and a perforated cap at the upper free end of said tube forming a warming member.

3. The structure set forth in claim 1, said adjustable supporting means comprising a pair of ears extending outwardly horizontally of said concave portion at either side thereof, a pair of upstanding threaded rods having their upper end portions threaded into said ears, a right-angled bracket upstanding from said heating chamber at a point substantially opposite the free end portions thereof and extending in a direction outwardly of said heating chamber, an upstanding threaded rod having its upper end threaded into the free end of said bracket whereby said threaded rods provide vertical adjustable support for said heating chamber.

References Cited in the file of this patent

UNITED STATES PATENTS

| | | |
|---|---|---|
| 434,225 | Young | Aug. 12, 1890 |
| 485,892 | Shivlar | Nov. 8, 1892 |
| 731,921 | Leach | June 23, 1903 |
| 1,080,113 | Von Kugelen et al. | Dec. 2, 1913 |
| 2,515,618 | Wallerius | July 18, 1950 |
| 2,535,112 | Woody | Dec. 26, 1950 |
| 2,541,328 | Boklep | Feb. 13, 1951 |
| 2,602,440 | Corns | July 8, 1952 |
| 2,684,669 | Ostrowski | July 27, 1954 |
| 2,716,977 | Loyles et al. | Sept. 6, 1955 |
| 2,737,175 | Dunston | Mar. 6, 1956 |
| 2,746,194 | Lonnman | May 22, 1956 |
| 2,747,569 | Holm et al. | May 29, 1956 |
| 2,774,856 | Paulsen et al. | Dec. 18, 1956 |
| 2,919,091 | Vander Cook | Dec. 29, 1959 |